No. 609,948. Patented Aug. 30, 1898.
J. G. RODGERS.
VEHICLE TIRE.
(Application filed Nov. 24, 1897.)
(No Model.)
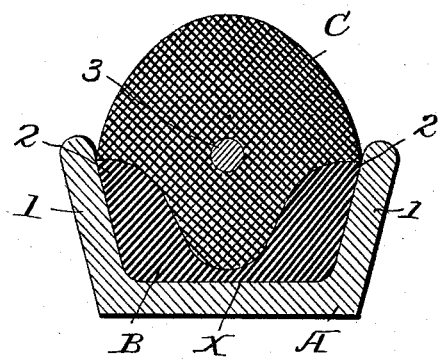
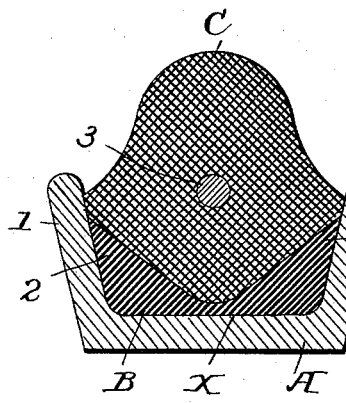
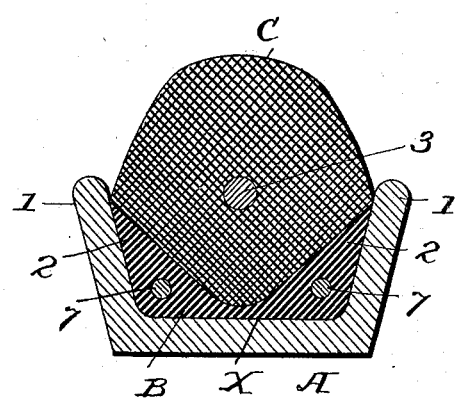
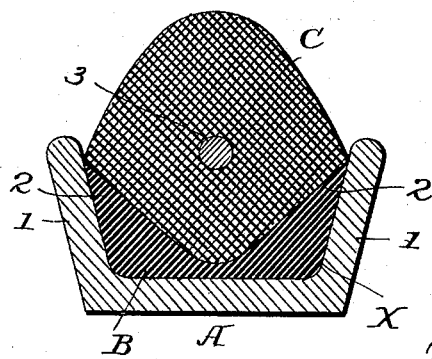
Witnesses
J. G. Hinkel
Harry E. Hay.
Inventor
James G. Rodgers
by Lister & Freeman
Attorneys
THE NORRIS PETERS CO., PHOTO-LITHO., WASHINGTON, D. C.

UNITED STATES PATENT OFFICE.

JAMES G. RODGERS, OF SPRINGFIELD, OHIO.

VEHICLE-TIRE.

SPECIFICATION forming part of Letters Patent No. 609,948, dated August 30, 1898.

Application filed November 24, 1897. Serial No. 659,691. (No model.)

*To all whom it may concern:*

Be it known that I, JAMES G. RODGERS, a citizen of the United States, residing at Springfield, in the county of Clark and State of Ohio, have invented certain new and useful Improvements in Vehicle-Tires, of which the following is a specification.

This invention relates to certain new and useful improvements in rubber vehicle-tires, having for its object to generally improve the construction and efficiency of such tires and to render them less liable to be accidentally removed from their seats upon a wheel.

With this object in view the invention consists in the novel construction, combination, and arrangement of the parts hereinafter more fully described.

In the accompanying drawings, forming a part of this specification, and in which like letters and numerals of reference indicate corresponding parts, Figure 1 is a cross-sectional view of the improved tire. Figs. 2, 3, and 4 are views illustrating different forms in which the tire-section can be made.

Referring more particularly to the drawings, A designates the wheel-rim, formed, preferably, as shown, with flaring annular side flanges 1 and with a peripheral channel, and it is preferred to form this channel with a flat bottom and with substantially flat sides which extend at an angle greater than a right angle to the bottom.

Within the rim-channel X is a flexible yielding base-section B, formed, preferably, of rubber, which conforms closely to the sides and bottom of the channel and may be secured thereto in any suitable manner, but preferably is stretched to hug its seat tightly. The base-section is therefore shorter than the periphery of the rim and is stretched, the ends being connected by any suitable fastening. This base-section is also preferably provided with a peripheral groove and with outwardly-flaring side flanges 2, which rest in contact with the rim-flanges, but terminate at points within the outer edges thereof. The peripheral groove of the base-section is preferably similar in contour to the rim-channel, having substantially flaring sides, and within said groove is secured the base of a yielding outer or tread section C, of rubber. This section, instead of being under tension, like the base-section, is under compression, being longer than its seat in the base-section and compressed longitudinally to the proper dimensions, and the base and tread sections are cemented together and to all intents and purposes are practically integral, forming a tire which is compressed at the outer periphery and distended at the inner side and which therefore will not rub in the channel.

Considerable difficulty has been experienced heretofore in tires of this character by reason of the yielding treads being forced out of their retaining-rims by the lateral strains imposed upon them, this in a great measure resulting from the yielding qualities of the rubber which it has been necessary to use in order to obtain the proper cushioning effect, especially when the tire is retained in the channel by a single wire. This objection might be overcome in a large measure by forming the tread of the tire of less resilient rubber; but it will readily be seen that the advantage would be attained at the expense of lessening the yielding efficiency of the tire. In order, therefore, to effect the permanent retention of the rubber tire within the channel of the rim without at the same time decreasing the resiliency of its tread portion, the base-section B of the tire is of rubber the yielding qualities of which are less than that of the tread-section C, and consequently when the two sections are secured together and within the rim-channel any lateral strain imposed upon the outer section will be transmitted to the inner or base section, the relatively low yielding quality of which will prevent its being stretched sufficiently to be forced without the rim-channel even if it lay loosely in the channel without being connected to the rim.

As an additional means of securing the tire within the rim A the tread-section is provided with one or more annular non-extensible retaining wires or strips 3, which extends longitudinally therethrough and centrally with respect to the width of the section, and which, owing to the compressed condition of the outer part and the distended condition of the inner part of the tire, will not creep in and tear the tire, as results with ordinary constructions. In practice it is preferred to vulcanize the tread-section C with a longitudinal opening extending therethrough, and subsequently pass the retaining-wire through the opening and secure its ends together. In some instances, however, a continuous wire ring may be embedded in the rubber while in a green state and vulcanized therein. It will be understood, too, that in some cases more than one retaining-wire may be employed, according to the conditions which have to be met, the wires being passed through the tread-section parallel to and separated from each other. In every instance, however, it is preferred to form the retaining-ring of a diameter corresponding to or less than the maximum diameter of the rim-flanges. If desired, clips 7 of metal cord or other unextensible material may be embedded in the section B to stiffen it.

In assembling the parts together the section B is first placed and secured under tension in the channeled rim, and the continuous tread-section C is then forced over the side flanges of the ring and brought to its seat within the groove of the base-section, and finally it is cemented to said section.

It will be noted that the outer part A in my improved tire is wide enough to wholly cover the inner portion. This prevents the wearing away of the inner part forming side channels between the outer part and the side flanges, which results when the inner part is exposed at the sides of the outer part, as heretofore.

Without limiting myself to the exact construction shown and described, what I claim is—

1. The combination with a channeled rim, of a tire within the channel of the rim comprising a base-section, and a tread-section formed separately, the base-section being under tension and the tread-section under compression, substantially as described.

2. The combination with a channeled rim, of a tire within the channel of the rim comprising a channeled base-section, and a tread-section formed separately, the tread-section being under compression and within the channel of the base-section to completely cover the same, and the base-section being under tension, substantially as described.

3. The combination with a channeled rim, of a tire within the channel of the rim comprising a base-section of yielding material under tension, and a tread-section of yielding material under compression, the yielding qualities of the tread-section being greater than those of the base-section, substantially as described.

4. The combination with a channeled rim, of a tire within the channel comprising a base-section of yielding material having a peripheral groove and a tread-section of relatively greater yielding material within said groove and a longitudinal retaining-wire passing through the outer section, substantially as described.

5. The combination with a channeled rim, of a tire comprising a base-section of yielding material having a peripheral groove, and a tread-section of relatively greater yielding material provided with a continuous non-extensible retaining-ring of a diameter less than the maximum diameter of the rim, substantially as described.

6. The combination with a rim having a peripheral channel and annular outwardly-flaring side flanges, of a tire comprising a base-section of yielding material conforming to the said channel and having a peripheral groove and a tread-section of yielding material within the groove provided with a continuous non-extensible retaining-ring, said tread-section extending beyond the rim and having its sides inclined inwardly from the side flanges of the rim and completely covering the base-section, substantially as described.

7. The combination with a rim having a peripheral groove and annular outwardly-flaring side flanges, of a tire within the channel comprising a base-section of yielding material conforming to the said channel and having a peripheral groove and a tread-section of relatively greater yielding material cemented within the groove provided with a continuous non-extensible retaining-wire, said tread-section extending beyond the rim and having its sides inclined inwardly from the side flanges of the rim, substantially as described.

In testimony whereof I have signed my name to this specification in the presence of two subscribing witnesses.

JAMES G. RODGERS.

Witnesses:
  O. F. SERVISS,
  EDWIN L. ANTRIM.